US009175160B2

(12) United States Patent
Peters

(10) Patent No.: US 9,175,160 B2
(45) Date of Patent: Nov. 3, 2015

(54) BLEND OF POLY(PHENYLENE ETHER) PARTICLES AND POLYOXYMETHYLENE, ARTICLE THEREOF, AND METHOD OF PREPARATION

(71) Applicant: SABIC Innovative Plastics IP B.V., Bergen op Zoom (NL)

(72) Inventor: Edward Norman Peters, Lenox, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 61 days.

(21) Appl. No.: 14/012,609

(22) Filed: Aug. 28, 2013

(65) Prior Publication Data
US 2015/0065661 A1    Mar. 5, 2015

(51) Int. Cl.
C08L 61/02        (2006.01)
C08J 3/00         (2006.01)
(Continued)

(52) U.S. Cl.
CPC .................. C08L 61/02 (2013.01); C08J 3/005 (2013.01); C08L 59/02 (2013.01); C08L 59/04 (2013.01); C08J 2361/02 (2013.01);
(Continued)

(58) Field of Classification Search
CPC ..... C08J 2371/12; C08J 2371/02; C08J 3/005
USPC .......................................................... 525/534
See application file for complete search history.

(56) References Cited

U.S. PATENT DOCUMENTS 2,768,994 A    10/1956   MacDonald
2,998,409 A     8/1961   Dal Nogare et al.
3,027,352 A     3/1962   Walling et al.
(Continued)

FOREIGN PATENT DOCUMENTS

CA       2048079 A      1/1993
CN     102219978 A     10/2011
(Continued)

OTHER PUBLICATIONS

Bledzki, et al.: "Poloxymethylene composites with natural and cellulose fibres: Toughness and heat deflection temperarture, Composites Science and Technology", 2012, vol. 72, No. 15 pp. 1870-1874. See pp. 1870 and 1871 (Abstract Only).
(Continued)

Primary Examiner — Mike M Dollinger
(74) Attorney, Agent, or Firm — Cantor Colburn LLP

(57) ABSTRACT

A composition contains (a) 1 to 40 weight percent of poly (phenylene ether) particles having a mean particle size of 1 to 40 micrometers; and (b) 60 to 99 weight percent of a polyoxymethylene; wherein polystyrene is absent from the poly (phenylene ether) particles; wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof. The poly(phenylene ether) particles reduce the density and increase the char yield of the polyoxymethylene. When the composition is prepared at a temperature below the glass transition temperature of the poly(phenylene ether), increased flexural strength can also be obtained. The composition is useful as a molding composition for a variety of articles.

19 Claims, 4 Drawing Sheets

(51) Int. Cl.
  *C08L 59/02* (2006.01)
  *C08L 59/04* (2006.01)
(52) U.S. Cl.
  CPC ......... *C08J 2471/00* (2013.01); *C08L 2201/02* (2013.01); *C08L 2201/08* (2013.01)

(56) References Cited

U.S. PATENT DOCUMENTS

| | | |
|---|---|---|
| 3,306,874 A | 2/1967 | Hay |
| 3,383,340 A | 5/1968 | MacCallum |
| 3,383,435 A | 5/1968 | Cizek |
| 3,513,114 A | 5/1970 | Hahn et al. |
| 3,836,829 A | 9/1974 | Eustance |
| 3,847,867 A | 11/1974 | Heath et al. |
| 3,850,885 A | 11/1974 | Takekoshi, et al. |
| 3,852,242 A | 12/1974 | White |
| 3,855,178 A | 12/1974 | White et al. |
| 3,873,477 A | 3/1975 | Beck et al. |
| 3,955,987 A | 5/1976 | Schaar et al. |
| 3,972,902 A | 8/1976 | Heath et al. |
| 3,983,093 A | 9/1976 | Williams, III et al. |
| 4,009,137 A | 2/1977 | Dany et al. |
| 4,216,261 A | 8/1980 | Dias |
| 4,336,184 A | 6/1982 | Halpern |
| 4,341,694 A | 7/1982 | Halpern |
| 4,443,591 A | 4/1984 | Schmidt et al. |
| 4,455,410 A | 6/1984 | Giles, Jr. |
| 4,801,625 A | 1/1989 | Parr et al. |
| 4,923,932 A | 5/1990 | Katayose et al. |
| 5,010,117 A | 4/1991 | Herrington et al. |
| 5,087,657 A | 2/1992 | Qureshi et al. |
| 5,304,593 A | 4/1994 | Nishio et al. |
| 5,326,817 A | 7/1994 | Orikasa et al. |
| 5,534,291 A | 7/1996 | Fukumura et al. |
| 5,811,492 A | 9/1998 | Mori et al. |
| 5,834,565 A | 11/1998 | Tracy et al. |
| 5,852,139 A | 12/1998 | Scheckenbach |
| 6,045,883 A | 4/2000 | Akiyama et al. |
| 6,051,662 A | 4/2000 | Tracy et al. |
| 6,096,817 A | 8/2000 | Mc Namara |
| 6,096,821 A * | 8/2000 | Adedeji et al. ............... 524/508 |
| 6,121,338 A | 9/2000 | Colman |
| 6,508,910 B2 | 1/2003 | Zhou et al. |
| 6,632,442 B1 | 10/2003 | Chyall et al. |
| 6,706,793 B2 | 3/2004 | Abu-Isa et al. |
| 6,756,430 B2 | 6/2004 | Matsuda et al. |
| 6,905,693 B2 | 6/2005 | Chyall et al. |
| 7,378,455 B2 | 5/2008 | Lu et al. |
| 7,429,800 B2 | 9/2008 | Lu et al. |
| 7,825,176 B2 | 11/2010 | Kim et al. |
| 7,829,614 B2 | 11/2010 | Ding et al. |
| 7,838,580 B2 | 11/2010 | Bauer et al. |
| 7,863,355 B2 | 1/2011 | Futterer et al. |
| 7,923,102 B2 | 4/2011 | Tilbrook et al. |
| 8,017,697 B2 | 9/2011 | Carrillo et al. |
| 8,026,303 B2 | 9/2011 | Levchik et al. |
| 8,206,808 B2 | 6/2012 | Khan et al. |
| 2001/0034430 A1 | 10/2001 | Yeager et al. |
| 2002/0028337 A1 | 3/2002 | Yeager et al. |
| 2002/0058780 A1 | 5/2002 | Moses et al. |
| 2003/0125479 A1* | 7/2003 | Kinsho et al. ............... 525/403 |
| 2003/0139492 A1 | 7/2003 | Abu-Isa |
| 2003/0139501 A1 | 7/2003 | Lewin |
| 2003/0158314 A1 | 8/2003 | Abu-Isa et al. |
| 2003/0209699 A1 | 11/2003 | Chyall et al. |
| 2003/0236361 A1 | 12/2003 | Yeager et al. |
| 2004/0092616 A1 | 5/2004 | Occhiello et al. |
| 2005/0032958 A1 | 2/2005 | Bauer et al. |
| 2005/0070685 A1 | 3/2005 | Mitsui et al. |
| 2005/0154130 A1* | 7/2005 | Adedeji et al. ............... 525/88 |
| 2005/0170238 A1 | 8/2005 | Abu-Isa et al. |
| 2005/0171266 A1 | 8/2005 | Matthijssen et al. |
| 2005/0228087 A1 | 10/2005 | Murakami et al. |
| 2006/0018131 A1 | 1/2006 | Kim et al. |
| 2007/0027227 A1 | 2/2007 | Shutov |
| 2007/0066739 A1 | 3/2007 | Odle et al. |
| 2007/0093602 A1 | 4/2007 | Thompson-Colon et al. |
| 2007/0173582 A1 | 7/2007 | Rukavina et al. |
| 2008/0114102 A1 | 5/2008 | Balfour et al. |
| 2008/0206449 A1 | 8/2008 | Klei et al. |
| 2008/0206468 A1 | 8/2008 | Klei et al. |
| 2009/0142495 A1 | 6/2009 | Green et al. |
| 2009/0211967 A1 | 8/2009 | Delsman et al. |
| 2009/0275682 A1 | 11/2009 | Furukawa et al. |
| 2010/0010128 A1 | 1/2010 | Levchik et al. |
| 2010/0139944 A1 | 6/2010 | Guo et al. |
| 2010/0190886 A1 | 7/2010 | Schmitt et al. |
| 2010/0209645 A1 | 8/2010 | Breen et al. |
| 2010/0276055 A1 | 11/2010 | Martin |
| 2010/0304118 A1 | 12/2010 | Baidak et al. |
| 2011/0028631 A1 | 2/2011 | Lawson |
| 2011/0259514 A1 | 10/2011 | Boyle et al. |
| 2012/0037396 A1 | 2/2012 | Gu |
| 2012/0164462 A1 | 6/2012 | Schmitt et al. |
| 2012/0305238 A1 | 12/2012 | Duan et al. |
| 2012/0305283 A1 | 12/2012 | Kalayjian et al. |
| 2012/0329961 A1 | 12/2012 | Carrillo et al. |
| 2014/0005340 A1 | 1/2014 | Peters et al. |
| 2014/0074813 A1 | 3/2014 | Franks et al. |
| 2014/0100312 A1 | 4/2014 | Peters |

FOREIGN PATENT DOCUMENTS

| | | |
|---|---|---|
| CN | 102492231 A | 6/2012 |
| CN | 102702562 A | 10/2012 |
| CN | 102731955 A | 10/2012 |
| CN | 101983987 B | 1/2013 |
| EP | 0119416 A1 | 9/1984 |
| EP | 1896519 B1 | 10/2012 |
| GB | 1330947 A | 9/1973 |
| JP | S5165159 A | 6/1976 |
| JP | H01222951 A | 9/1989 |
| JP | H03197538 A | 8/1991 |
| JP | H04159366 A | 6/1992 |
| JP | 2519767 B1 | 7/1996 |
| JP | H09104094 A | 4/1997 |
| JP | 2001019839 A | 1/2001 |
| JP | 2002516369 A | 6/2002 |
| JP | 2003128909 A | 5/2003 |
| JP | 2005105009 A | 4/2005 |
| JP | 2006063114 | 3/2006 |
| JP | 2008050526 A | 3/2008 |
| KR | 1019950011895 B1 | 10/1995 |
| WO | 9518841 A1 | 7/1995 |
| WO | 0060002 A1 | 10/2000 |
| WO | 0123473 A1 | 4/2001 |
| WO | 02096996 A1 | 12/2002 |
| WO | 2005113661 A1 | 12/2005 |
| WO | 2006042833 A1 | 4/2006 |
| WO | 2011134622 A1 | 11/2011 |
| WO | 2011134623 A1 | 11/2011 |
| WO | 2012045414 A1 | 4/2012 |
| WO | 2012113520 A1 | 8/2012 |
| WO | 2013058690 A1 | 4/2013 |

OTHER PUBLICATIONS

Written Opinion for International Application No. PCT/US2014/052582; International Filing Date Aug. 25, 2014; Date of Mailing Dec. 9, 2014; 5 pages.

U.S. Appl. No. 13/930,456, filed Jun. 28, 2013.

U.S. Appl. No. 13/948,416, filed Jul. 23, 2013.

Everaert et al.; "Phase Morphology Development in Immiscible PP/(PS/PPE) Blends Influence of the Melt-Viscosity Ratio and Blend Composition"; Polymer; 40; pp. 6627-6644; (1999).

Everaert et al.; "Miscible PS/PPE Compounds: an Alternative for Blend Phase Morphology Studies? Influence of the PPE Content on the Surface Tension of PS/PPE and on the Interfacial Tension in PP/(PS/PPE) and POM/(PS/PPE) Blends"; Polymer; 41; pp. 1011-1025; (2000).

(56) References Cited

OTHER PUBLICATIONS

Everaert et al.; "Influence of Fractionated Crystallization on the Semicrystalline Structure of (POM/(PS/PPE)) Blends, Static and Time-Resolved SAXS, WAXD and DSC Studies"; Polymer; 44; pp. 3491-3508; (2003).
Harashina et al.; "Synergistic Effect of Red Phosphorous, Novolac and Melamine Ternary Combination on Flame Retardancy of Poly(oxymethylene)"; Polymer Degradation and Stability; 91; pp. 1996-2002; 2006).
D. W. van Krevelen; "Some Basic Aspects of Flame Resistance of Polymeric Materials"; Polymer; 16; pp. 615-620; (1975).
Wang, et al.; "Flame Retardant Polyoxymethylene with Aluminium Hydroxide/Melamine/Novolac Resin Synergistic System"; Polymer Degradation and Stability; 95; pp. 945-954; (2010).
Zhang et al.; "Synergistic Effects of Ammonium Polyphosphate/Melamine Intumescent System with Macromolecular Char Former in Flame-Retarding Polyoxymethylene"; J. Polym Res.; 18; pp. 293-303; (2011).
U.S. Appl. No. 13/538,295, filed Jun. 26, 2012.
U.S. Appl. No. 13/647,829, filed Oct. 9, 2012.
U.S. Appl. No. 14/015,044, filed Aug. 30, 2013.
U.S. Appl. No. 14/044,904, filed Oct. 3, 2013.
Celcon M90, Information Sheet, Ticona Engineering Polymers, Jan. 8, 2007, 6 pages.
DELRIN 900P NC010, Product Information, DuPont Delrin, acetal resin, 2010, 4 pages.
Derakhshesh et al.; "Design and Optimization of an Intumescent Flame Retardant Coating Using Thermal Degradation Kinetics and Taguchi's Experimental Design"; Polymer International; 61(6) pp. 926-933; (2012).
Levchik et al., "Thermal decomposition, combustion and fire-retardancy of polyurethanes—a review of the recent literature", Polymer International, vol. 53, pp. 1585-1610, 2004.
Oxley et al.; "Decomposition of Azo & Hydrazo linked Bis Triazines"; 20 pages (2008) http_energetics.chm.uri.edu_q=_system-files-2008 Decomposition of Azo & Hydrazo linked Bis Triazines.pdf.
International Search Report for International Application No. PCT/US2012/070829; International Filing Date Dec. 20, 2012; Date of Mailing Jul. 15, 2013; 6 pages.
Written Opinion for International Application No. PCT/US2012/070829; International Filing Date Dec. 20, 2012; Date of Mailing Jul. 15 2013; 4 pages.
Ullah et al.; Effect of Boric Acid with Kaolin Clay on Thermal Degradation of Intumescent Fire Retardant Coating; Journal of Applied Sciences; pp. 1-5 (2011).
Wang, Guojian et al.; Thermal Degradation Study of Fire Resistive Coating Containing Melamine Polyphosphate and Dipentaerythritol; Progress in Organic Coatings; 72; pp. 605-611; (2011).
Wang, Zhen-yu; "Fire-Resistant Effect of Nanoclay on Intumescent Nanocomposite Coatings"; Journal of Applied Polymer Science; 103; pp. 1681-1689; (2007).
Yew et al.; "Effect of Epoxy Binder on Fire Protection and Bonding Strength of Intumescent Fire Protective Coatings for Steel"; Advanced Materials Research; 10.4028/www.scientific.net/AMR.168-170.1228; vol. 168-170; (2010).
International Search Report for International application No. PCT/US2014/052582; International Filing Date Aug. 25, 2014; Date of mailing Dec. 9, 2014; 5 pages.
Non-Final Office Action for U.S. Appl. No. 13/538,295; Application filing date Jun. 29, 2012; Notification date Feb. 4, 2015; 25 pages.
Non-Final Office Action for U.S. Appl. No. 13/538,295; Application filing date Jun. 29, 2012; Notification date Aug. 27, 2014; 29 pages.
Non-Final Office Action for U.S. Appl. No. 13/930,456; Application filing date Jun. 28, 2013; Notification date Mar. 24, 2015; 13 pages.
Non-Final Office Action for U.S. Appl. No. 13/948,416; Application filing date Jul. 23, 2013; Notification date Jun. 30, 2015; 10 pages.
Fink, "Reactive Polymers Fundamentals and Applications: A Concise Guide to Industrial Polymers" Epoxy Resins, 3, 2013, 3 pages.
Non-Final Office Action for U.S. Appl. No. 14/044,904; Application filing date Oct. 3, 2013; Notification date Jul. 2, 2015; 6 pages.
Non-Final Office Action for U.S. Appl. No. 13/538,295; Application filing date Jun. 29, 2012; Notification date Sep. 3, 2015; 31 pages.

* cited by examiner

BLEND OF POLY(PHENYLENE ETHER) PARTICLES AND POLYOXYMETHYLENE, ARTICLE THEREOF, AND METHOD OF PREPARATION

BACKGROUND OF THE INVENTION

Polyoxymethylenes (POM), also known as polyacetals, are (co)polymers of formaldehyde. Pure formaldehyde is readily polymerized, but the polymer equally readily, spontaneously de-polymerizes, that is, the polymer unzips. Stabilization of polyoxymethylene can be achieved by end-capping the terminal hydroxyl groups with alkyl or acyl groups, by etherification or esterification respectively, as shown in Scheme 1. S. D. Nagare, U.S. Pat. No. 2,998,409, Aug. 29, 1961 to E. I. duPont de Nemours & Co. End-capped polyoxymethylene is sold commercially under the DELRIN™ trade name.

Scheme 1

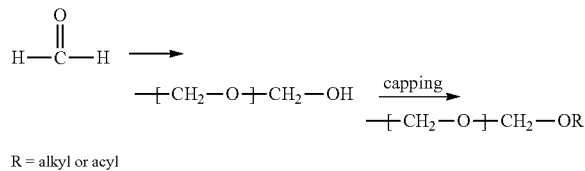

R = alkyl or acyl

Stabilization of polyoxymethylene can also be achieved by copolymerizing formaldehyde with ethylene oxide, as shown in Scheme 2. C. Walling et al. U.S. Pat. No. 3,027,352, Mar. 27, 1962 to Celanese Corp. Polyoxymethylene copolymer is sold commercially under the CELCON™ trademark.

Scheme 2

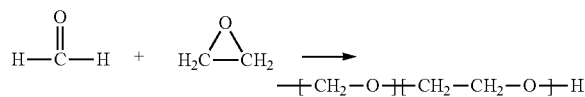

Polyoxymethylenes exhibit rigidity, high strength, excellent creep resistance, fatigue resistance, toughness, self-lubricity/wear resistance, and broad resistance to chemicals and solvents. Therefore polyoxymethylenes have utility in metal replacement. Metal items that can be replaced by polyoxymethylene include plumbing hardware, pumps, gears, and bearings.

Although polyoxymethylene is used in many applications, it has drawbacks which limit its use. Polyoxymethylene is a semi-crystalline plastic with a crystalline content of about 75 to 85%. Semi-crystalline plastics can become less rigid above their glass transition temperature and below their crystalline melting point. As a consequence, semi-crystalline plastics can exhibit a lower heat deflection temperature under high load than low load, for example, under a 1.82 versus a 0.455 megapascal load. Thus, it is desirable to increase the heat deflection temperature under high load for polyoxymethylenes. Polyoxymethylene, which has the lowest limiting oxygen index (LOI) of commercial thermoplastics—only about 15%—is extremely combustible and difficult to flame retard. H. Harashina et al. *Polym. Degrad. and Stability*, 91, (2006), 1996-2002. Z.-Y. Wang, Y. Liu, Q. Wang *Polym. Degrad. and Stability*, 95, (2010), 945-954. Thus there is a need for improvement in the flame resistance of polyoxymethylene. Q. Zhang et al. *J. Polym. Res.*, 18 (2011), 293-303. Density is an important parameter for polymers. For an equal weight of polymer, more parts can be prepared from a polymer with a lower density. Polyoxymethylenes have a high density compared to other thermoplastics. Thus, a decrease in the density of polyoxymethylene compositions can have economic benefits.

In summary, there is a need in the art for polyoxymethylene compositions having higher heat deflection temperature under high load, higher flame resistance, and lower density.

BRIEF SUMMARY OF EMBODIMENTS OF THE INVENTION

One embodiment is a composition comprising (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the poly(phenylene ether) particles; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof.

Another embodiment is a composition comprising (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the composition; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof.

Another embodiment is an article comprising the composition.

Another embodiment is a method of preparing the composition comprising mixing poly(phenylene ether) particles and polyoxymethylene at a temperature below the glass transition temperature of the poly(phenylene ether).

Another embodiment is a method of forming an article comprising the composition, comprising forming the article at a temperature below the glass transition temperature of the poly(phenylene ether).

These and other embodiments are described in detail below.

BRIEF DESCRIPTION OF THE DRAWINGS

Referring now to the drawings.

DETAILED DESCRIPTION OF THE INVENTION

Figure 1:
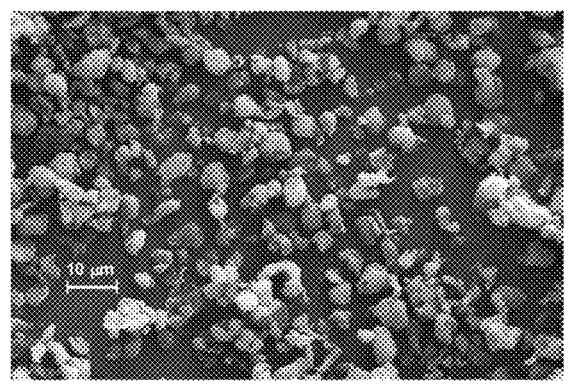
FIG. 1 is a scanning electron microscope image of PPE particles-A, viewed under 1,000× magnification.

Although polyoxymethylenes are used in many applications, there is a need for polyoxymethylene compositions having higher heat deflection temperature under high load, higher flame resistance, and lower density than polyoxymethylene itself. Melt-mixed blends of polyoxymethylene (POM) and polystyrene/poly(phenylene ether) (PS/PPE) blends have been reported. V. Everaert et al., *Polymer*, 41 (2000), 1011-1025. Polyoxymethylene and polystyrene/poly (2,6-dimethyl-1,4-phenylene ether) blends were melt-mixed under nitrogen in a mini-extruder, with conical co-rotating fully intermeshing twin-screws for 5 minutes at 260° C., which is well above the glass transition temperature of the poly(2,6-dimethyl-1,4-phenylene ether). V. Everaert et al., *Polymer*, 44 (2003), 3491-3508.

The present inventor has discovered compositions comprising polyoxymethylene and poly(phenylene ether) particles, advantageously having higher char yields, higher heat deflection temperatures under high load, and lower density than polyoxymethylene alone. Moreover, when the polyoxymethylene and poly(phenylene ether) particles are mixed below the glass transition temperature of the poly(phenylene ether), flexural modulus and flexural stress are higher than the same compositions wherein the polyoxymethylene and poly (phenylene ether) particles are mixed above the glass transition temperature of the poly(phenylene ether).

All ranges disclosed herein are inclusive of the endpoints, and the endpoints are independently combinable with each other. The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "(a)", "(b)", and the like herein do not denote any order, quantity, or importance, but rather are used to distinguish one element from another. All component weight percents are expressed on a solids basis, i.e. any solvent present is not included in the weight of the component.

As used herein, the phrase, "absent from the composition" means that the composition comprises less than 10,000 parts per million, specifically less than 1,000 parts per million, more specifically less than 100 parts per million, still more specifically less than 10 parts per million, and yet more specifically, less than 1 parts per million, of a component, based on the total weight of the composition.

The composition comprises: (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the poly(phenylene ether) particles; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof. Advantageously, the poly(phenylene ether) particles are an effective carbon source. A carbon source is defined as an organic material that decomposes to a char consisting primarily of carbon when exposed to fire or heat.

The poly(phenylene ether) comprises repeating structural units of the formula

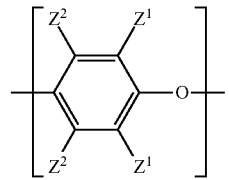

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$, hydrocarbylthio, $C_1$-$C_{12}$, hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$, hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(phenylene ether) can comprise molecules having aminoalkyl-containing end group(s), generally located ortho to the hydroxy group. Also frequently present are tetramethyldiphenoquinone (TMDQ), tetramethylbiphenyl (TMBP), or diphenoquinone residue end groups, generally obtained from reaction mixtures in which tetramethyldiphenoquinone by-product is present. In some embodiments the poly(phenylene ether) comprises TMDQ end groups in an amount of less than 5 weight percent, specifically less than 3 weight percent, more specifically less than 1 weight percent, based on the weight of the poly(phenylene ether). In some embodiments, the poly(phenylene ether) comprises, on average, about 0.7 to about 2 moles, specifically about 1 to about 1.5 moles, of chain-terminal hydroxyl groups per mole of poly(phenylene ether).

The poly(phenylene ether) can be in the form of a homopolymer, a copolymer, a graft copolymer, an ionomer, or a block copolymer, as well as a combination comprising at least one of the foregoing. Poly(phenylene ether) includes polyphenylene ether comprising 2,6-dimethyl-1,4-phenylene ether units optionally in combination with 2,3,6-trimethyl-1,4-phenylene ether units. In some embodiments, the poly(phenylene ether) is an unfunctionalized poly(phenylene ether). An unfunctionalized poly(phenylene ether) is a poly(phenylene ether) consisting of the polymerization product of one or more phenols. The term "unfunctionalized poly(phenylene ether)" excludes functionalized poly(phenylene ether)s such as acid-functionalized poly(phenylene ether)s and anhydride-functionalized poly(phenylene ether)s. In some embodiments, the poly(phenylene ether) is poly(2,6-dimethyl-1,4-phenylene ether).

The poly(phenylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

In some embodiments, the composition comprises less than or equal to 2 weight percent, specifically less than or equal to 1 weight percent, more specifically less than or equal to 0.5 weight percent, of a poly(phenylene ether)-polysiloxane block copolymer. In some embodiments, the composition excludes poly(phenylene ether)-polysiloxane block copolymer. Poly(phenylene ether)-polysiloxane block copolymers, which comprise at least one poly(phenylene ether) block and at least one polysiloxane block, are described, for example, in U.S. Patent Application Publication No. US 2010/0139944 A1 (Guo et al.).

In some embodiments, the poly(phenylene ether) is characterized by a weight average molecular weight and a peak molecular weight, wherein a ratio of the weight average molecular weight to the peak molecular weight is 1.3:1 to 4:1. Within this range, the ratio can be 1.5:1 to 3:1, specifically 1.5:1 to 2.5:1, more specifically 1.6:1 to 2.3:1, still more specifically 1.7:1 to 2.1:1. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(phenylene ether) molecular weight of the highest point in a plot of molecular weight on the x-axis versus absorbance on the y-axis.

In some embodiments, the poly(phenylene ether) is essentially free of incorporated diphenoquinone residues. "Diphenoquinone residues" refers to the dimerized moiety that can form in the oxidative polymerization reaction giving rise to the poly(phenylene ethers) contemplated for use in the present invention. As described in U.S. Pat. No. 3,306,874 (Hay), synthesis of poly(phenylene ethers) by oxidative polymerization of monohydric phenols yields not only the desired poly(phenylene ether) but also a diphenoquinone side product. For example, when the monohydric phenol is 2,6-dimethylphenol, 3,3',5,5'-tetramethyldiphenoquinone (TMDQ) is generated. In general, the diphenoquinone is "re-equilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues. As used herein, "essentially free" means that fewer than 1 weight percent of poly(phenylene ether) molecules comprise the residue of a diphenoquinone as measured by nuclear magnetic resonance spectroscopy (NMR) (Mole of TMDQ×Molecular Weight of unit TMDQ)/(Mole of Polymer×Number Average Molecular Weight ($M_n$)). In some embodiments, fewer than 0.5 weight percent of poly(phenylene ether) molecules comprise the residue of a diphenoquinone.

For example, as shown in Scheme 3, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone.

Scheme 3

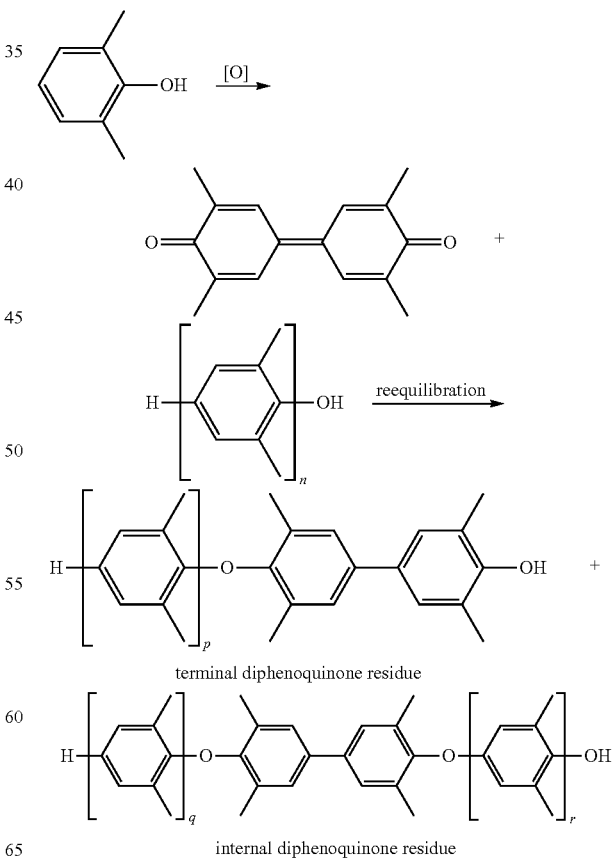

However, such re-equilibration reduces the molecular weight of the poly(phenylene ether) (e.g., p and q+r are less than n). Accordingly, when a higher molecular weight and stable molecular weight poly(phenylene ether) is desired, it may be desirable to separate the diphenoquinone from the poly(phenylene ether) rather than re-equilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble with very minimum time between end of reaction and precipitation.

For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or methanol water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the re-equilibration of the diphenoquinone into the poly(phenylene ether) chain can be minimized (e.g., by isolating the poly(phenylene ether) no more than 200 minutes after termination of oxidative polymerization). These approaches are described in United States Application Publication 2009/0211967 (Delsman et al.). Alternatively, diphenoquinone amounts can be achieved by removing the TMDQ formed during polymerization by filtration, specifically after stopping the oxygen feed into the polymerization reactor.

The poly(phenylene ether) can comprise 2,6-dimethyl-1,4-phenylene ether units, 2,3,6-trimethyl-1,4-phenylene ether units, or a combination thereof. In some embodiments, the poly(phenylene ether) is poly(2,6-dimethyl-1,4-phenylene ether). The poly(2,6-dimethyl-1,4-phenylene ether) can have an intrinsic viscosity of 0.3 to 1.5 deciliter per gram, specifically 0.3 to 0.6 deciliters per gram, as measured in chloroform at 25° C. For poly(2,6-dimethyl-1,4-phenylene ether), an intrinsic viscosity of 0.3 to 0.6 deciliters per gram corresponds to a number average molecular weight range of 16,000 to 25,000 atomic mass units. In specific embodiments, the poly(phenylene ether) comprises poly(2,6-dimethyl-1,4-phenylene ether) having an intrinsic viscosity of 0.46 deciliters per gram, 0.40 deciliters per gram, or 0.30 deciliters per gram.

The poly(phenylene ether) particles have a mean particle size (volume distribution) of 0.01 to 100 micrometers, as determined by particle size distribution analysis. Within this range, the poly(phenylene ether) particles can have a mean particle size of 1 to 100 micrometers, specifically 1 to 40 micrometers, more specifically 1 to 30 micrometers, still more specifically 1 to 20 micrometers, and yet more specifically 1 to 10 micrometers. In some embodiments, the poly(phenylene ether) particles have a mean particle size of 1 to 10 micrometers.

The poly(phenylene ether) particles can have a mean particle size of 15 micrometers, 10 micrometers, or 6 micrometers. The poly(phenylene ether) particles can have a mean particle size of 6.07 micrometers and a standard deviation of 2.3 micrometers, a mean particle size of 10.9 micrometers and a standard deviation of 4.7 micrometers, or a mean particle size of 15.7 micrometers and a standard deviation of 5.9 micrometers.

Ninety percent of the particle volume distribution of the poly(phenylene ether) particles can be less than 23 micrometers, less than 17 micrometers, or less than 8 micrometers. In some embodiments, 90 percent of the particle volume distribution of the poly(phenylene ether) particles is less than 8 micrometers. Fifty percent of the particle volume distribution of the poly(phenylene ether) particles can be less than 15 micrometers, less than 10 micrometers, or less than 6 micrometers. Ten percent of the particle volume distribution of the poly(phenylene ether) particles can be less than 9 micrometers, less than 6 micrometers, or less than 4 micrometers.

It can be desirable to avoid poly(phenylene ether) particles less than or equal to 38 nanometers in diameter, because these particles pose an explosion hazard. Thus in some embodiments, less than 10%, specifically less than 1%, and more specifically less than 0.1%, of the particle volume distribution is less than or equal to 38 nanometers.

In some embodiments, the poly(phenylene ether) particles have an aspect ratio of 0.5 to 0.9, specifically 0.6 to 0.9, more specifically 0.7 to 0.9, and still more specifically 0.7 to 0.8.

The composition comprises 1 to 40 weight percent, specifically 5 to 40 weight percent, and more specifically 10 to 40 weight percent of poly(phenylene ether) particles, based on the combined weight of the poly(phenylene ether) particles and the polyoxymethylene.

Poly(phenylene ether) particles can be obtained according to methods readily available to the skilled artisan, for example by jet milling, ball milling, pulverizing, air milling, or grinding commercial grade poly(phenylene ether). "Classification" is defined as the sorting of a distribution of particles to achieve a desired degree of particle size uniformity. A classifier is often used together with milling for the continuous extraction of fine particles from the material being milled. The classifier can be, for example, a screen of certain mesh size on the walls of the grinding chamber. Once the milled particles reach sizes small enough to pass through the screen, they are removed. Larger particles retained by the screen remain in the milling chamber for additional milling and size reduction.

Air classification is another method of removing the finer particles from milling Air classifiers include static classifiers (cyclones), dynamic classifiers (single-stage, multi-stage), cross-flow classifiers, and counter-flow classifiers (elutriators). In general, a flow of air is used to convey the particles from the mill to the classifier, where the fine particles are further conveyed to a collector. The course particles, being too heavy to be carried by the air stream, are returned to the mill for further milling and size reduction. In larger operations, air classification is more efficient, while in smaller operations a screen can be used.

Polystyrene is absent from the poly(phenylene ether) particles. As used herein, the phrase, "absent from the poly(phenylene ether) particles" means that the particles comprise less than 10,000 parts per million, specifically less than 1,000 parts per million, more specifically less than 100 parts per million, still more specifically less than 10 parts per million, and yet more specifically, less than 1 parts per million of polystyrene, based on the total weight of the poly(phenylene ether) particles. In some embodiments, polystyrene is absent from the composition.

The polystyrene can have a number average molecular weight of 10,000 to 200,000 atomic mass units, specifically 30,000 to 100,000 atomic mass units. The polystyrene can be atactic, isotactic, or syndiotactic. In some embodiments, the polystyrene is an atactic polystyrene. The atactic polystyrene can have a melt flow index of 0.5 to 10 grams per 10 minutes, specifically 1 to 5 grams per 10 minutes, measured at 200° C. and a 5-kilogram load according to ASTM D1238. The atactic polystyrene can have a mineral oil content of less than or equal to 5 weight percent, specifically less than or equal to 2 weight percent. In a specific embodiment, the polystyrene is an atactic polystyrene having a number average molecular weight of 30,000 to 100,000 atomic mass units.

In general, poly(phenylene ether) can be blended with other thermoplastic resins to reduce the glass transition temperature and improve the moldability of the poly(phenylene ether). For example, poly(2,6-dimethyl-1,4-phenylene ether) can be blended with polystyrene, poly(styrene-acrylonitrile), or high-impact polystyrene. Cizek, U.S. Pat. No. 3,383,435, May 14, 1968 to General Electric. It can be desirable to avoid reduction of the glass transition temperature of the poly(phenylene ether) particles to a temperature below the extrusion and molding temperatures of the composition. Thus in some embodiments, the poly(phenylene ether) particles have a glass transition temperature that is 0 to 50° C., specifically 0 to 40° C., more specifically 0 to 30° C., still more specifically 0 to 20° C., and yet more specifically 0 to 10° C., lower than the glass transition temperature of the poly(phenylene ether). In some embodiments, the poly(phenylene ether) is not blended with another thermoplastic resin, and the poly(phenylene ether) particles consist of poly(phenylene ether). When the poly(phenylene ether) is not blended with another thermoplastic resin, the glass transition temperature of the poly(phenylene ether) particles is the glass transition temperature of the poly(phenylene ether).

The composition comprises 60 to 99 weight percent of a polyoxymethylene. Polyoxymethylenes are polymers having oxymethylene repeat units of formula (I)

$$—CH_2O—  \quad (I)$$

The polyoxymethylene can be a homopolymer of formaldehyde, in which terminal hemiacetal groups of formula (II)

$$—CH_2OH \quad (II)$$

are end-capped with an alkyl group or an acyl group to form terminal ether groups of formula (III) or terminal ester groups of formula (IV) respectively,

wherein R is a $C_{1-18}$ alkyl, cycloalkyl, or aryl group.

The polyoxymethylene can also be a copolymer comprising oxymethylene and diol repeat units, and can be formed by copolymerization of formaldehyde with a diol or a cyclic ether. In addition to oxymethylene repeat units, the polyoxymethylene copolymer can have repeat units of formula (V)

wherein $R^1$ and $R^2$ are independently selected from hydrogen, $C_{1-6}$ alkyl, and $C_{1-6}$ alkyl substituted with halogen or hydroxyl, and n is an integer from 1 to 3. The polyoxymethylene copolymer can have 85 to 99.9 mole percent of oxymethylene repeat units and 0.1 to 15 mole percent of repeat units of formula (V), based on the total moles of oxymethylene repeat units and repeat units of formula (V).

In some embodiments, the polyoxymethylene is selected from a homopolymer of formaldehyde end-capped with acetic anhydride, a copolymer of formaldehyde and ethylene oxide or dioxolane, and a combination thereof. An example of a homopolymer of formaldehyde end-capped with acetic anhydride is DELRIN™ 900P NC010, available from Dupont. An example of a copolymer of formaldehyde and ethylene oxide or dioxolane is CELCON™ M90™, available from Ticona.

The composition comprises 60 to 99 weight percent, specifically 60 to 95 weight percent, and more specifically 60 to 90 weight percent of polyoxymethylene, based on the combined weight of the poly(phenylene ether) particles and the polyoxymethylene.

The presence of metals, metalloids, and oxides thereof can be detrimental in some applications of the composition. Thus, the composition comprises less than 0.1 volume percent, specifically less than 0.01 volume percent, and more specifically less than 0.001 volume percent, based on the total volume of the composition, of particulate metals, metalloids, oxides thereof, and combinations thereof. As defined herein, metalloids are chemical elements that have properties in between metals and nonmetals. Examples of metalloids include boron, silicon, germanium, arsenic, antimony, and tellurium. In some embodiments, the metals and metalloids are selected from iron, copper, aluminum, magnesium, lead, zinc, tin, chromium, nickel, tungsten, silicon, gold, silver, platinum, and alloys thereof.

Polystyrene can be absent from the composition. Thus, in some embodiments, a composition comprises: (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the composition; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof.

In a specific embodiment, the composition comprises (a) 5 to 40 weight percent of poly(2,6-dimethyl-1,4-phenylene ether) particles having a mean particle size of 1 to 10 micrometers; and (b) 60 to 95 weight percent of a polyoxymethylene selected from a homopolymer of formaldehyde end-capped with acetic anhydride, a copolymer of formaldehyde and ethylene oxide or dioxolane, and a combination thereof; wherein the weight percents are based on the combined weight of the poly(2,6-dimethyl-1,4-phenylene ether) particles and the polyoxymethylene; wherein polystyrene is absent from the poly(2,6-dimethyl-1,4-phenylene ether) particles; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof.

In some embodiments, polyolefins, rubber-modified polystyrenes, styrene-containing copolymers, and hydrogenated and unhydrogenated block copolymers of an alkenyl aromatic compound and a conjugated diene, and combinations thereof are absent from the poly(phenylene ether) particles.

Polyolefins are polymers produced from an olefin monomer having the general formula $C_nH_{2n}$. Polyolefins can be thermoplastic or elastomeric. Examples of thermoplastic polyolefins are polyethylene (PE), polypropylene (PP), and polybutene-1 (PB-1). Examples of elastomeric polyolefins are polyisobutylene (PIB), ethylene-propylene rubber (EPR), and ethylene-propylene-diene monomer rubber (EPDM rubber). Depending on temperature, pressure, catalyst, and the use of a comonomer, three types of polyethylene can be produced: high-density polyethylene (HDPE), low-density polyethylene (LDPE), and linear low-density polyethylene (LLDPE). LLDPE is prepared by copolymerization of ethylene with an α-olefin. In this way, branching is introduced in a controlled manner with branches of uniform chain length. LLDPE comonomers include 1-butene, 1-hexene, 1-octene, and 4-methyl-1-pentene (4M1P). Specialty grades of polyethylene include very low density (VLDPE), medium density (MDPE), and ultra-high molecular weight polyethylene (UHMWPE).

Rubber-modified polystyrenes, comprising polystyrene and polybutadiene, can be absent from the composition. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some embodiments, the rubber-modified polystyrene has an effective gel content of 10 to 35 percent. An example of a rubber-modified polystyrene is GEH HIPS 1897, available from SABIC Innovative Plastics.

Hydrogenated block copolymers of an alkenyl aromatic compound and a conjugated diene can be absent from the composition. For brevity, this component is referred to herein as a "hydrogenated block copolymer". The hydrogenated block copolymer generally comprises 10 to 45 weight percent poly(alkenyl aromatic) content, based on the weight of the hydrogenated block copolymer. Within this range, the poly(alkenyl aromatic) content can be 20 to 40 weight percent, specifically 25 to 35 weight percent.

The hydrogenated block copolymer can have a weight average molecular weight of at least 100,000 atomic mass units. In some embodiments the hydrogenated block copolymer comprises a polystyrene-poly(ethylene-butylene)-polystyrene triblock copolymer having a weight average molecular weight of 100,000 to 1,000,000 atomic mass units, specifically 100,000 to 400,000 atomic mass units.

The alkenyl aromatic monomer used to prepare the hydrogenated block copolymer can have the structure

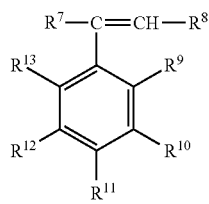

wherein $R^7$ and $R^8$ each independently represent a hydrogen atom, a $C_1$-$C_8$ alkyl group, or a $C_2$-$C_8$ alkenyl group; $R^9$ and $R^{13}$ each independently represent a hydrogen atom, a $C_1$-$C_8$ alkyl group, a chlorine atom, or a bromine atom; and $R^{10}$, $R^{11}$, and $R^{12}$ each independently represent a hydrogen atom, a $C_1$-$C_8$ alkyl group, or a $C_2$-$C_8$ alkenyl group, or $R^{10}$ and $R^{11}$ are taken together with the central aromatic ring to form a naphthyl group, or $R^{11}$ and $R^{12}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and a combination thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON™ G1701 (having 37 weight percent polystyrene) and G1702 (having 28 weight percent polystyrene); the polystyrene-poly(ethylene-butylene)-polystyrene triblock copolymers available from Kraton Polymers as KRATON™ G1641 (having 33 weight percent polystyrene), G1651 (having 31-33 weight percent polystyrene), and G1654 (having 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ CH-6170, CH-7171, CH-6174 and CH-6140, and from Kuraray as SEPTON™ 8006 and 8007; polystyrene-poly(ethylene-propylene)-polystyrene (SEPS) copolymers available from Kuraray as SEPTON™ 2006 and 2007; and oil-extended compounds of these hydrogenated block copolymers available from Kraton Polymers as KRATON™ G4609 and G4610 and from Asahi as TUFTEC™ H1272. Mixtures of two of more hydrogenated block copolymers can be used. In some embodiments, the hydrogenated block copolymer comprises a polystyrene poly(ethylene-butylene)-polystyrene triblock copolymer having a weight average molecular weight of at least 100,000 atomic mass units.

Unhydrogenated block copolymers can be absent from the composition. Unhydrogenated block copolymers are similar to the hydrogenated block copolymers described above, except that the aliphatic unsaturation of the poly(conjugated diene) blocks is not hydrogenated. Unhydrogenated block copolymers include, for example, polystyrene-polybutadiene diblock copolymers, polystyrene-polybutadiene-polystyrene triblock copolymers, polystyrene-polyisoprene diblock copolymers, polystyrene-polyisoprene-polystyrene triblock copolymers, and a combination thereof. Unhydrogenated block copolymers are known in the art. They may be either pure block copolymers or tapered (overlap) copolymers. Tapered styrene-rubber block copolymers have an area of the polymer between the styrene and rubber blocks in which both monomer units are present. The taper area is thought to exhibit a gradient, from a styrene-rich area closest to the styrene block to a rubber-rich area closest to the rubber block.

Advantageously, the composition can have decreased density, increased heat deflection temperature under a load of 1.92 megapascals, and increased char, relative to the same composition in the absence of poly(phenylene ether) particles. For example, when the poly(phenylene ether) particles consist of poly(phenylene ether), the composition can have one or more of: a density of 1.10 to 1.38 grams per cubic centimeter, measured in accordance with ASTM D 792-08 at 23° C.; a heat deflection temperature of 105 to 150° C., measured at 1.92 megapascals in accordance with ASTM D648-07; and 2 to 30 weight percent char, based on the total weight of the poly(phenylene ether) particles and the polyoxymethylene, and measured at 600° C. in air by thermogravimetric analysis.

A method of preparing a composition comprises mixing the poly(phenylene ether) particles and the polyoxymethylene at a temperature below the glass transition temperature of the poly(phenylene ether), wherein the composition comprises (a) 1 to 40 weight percent of a poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the composition; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof. When prepared in this way, the composition comprises a continuous phase comprising the polyoxymethylene; and a disperse phase comprising the poly(phenylene ether) particles and having a mean particle size of 1 to 40 micrometers. The mixing can be done using known equipment such as ribbon blenders, Henschel mixers, Banbury mixers, drum tumblers, single-screw extruders, twin-screw extruders, multi-screw extruders, co-kneaders, and the like.

It can be advantageous to prepare the composition at a temperature below the glass transition temperature of the poly(phenylene ether). For example, when the poly(phenylene ether) particles consist of poly(2,6-dimethyl-4-phenylene ether), which has a glass transition temperature of 215° C., the mixing can be conducted at a temperature below 215° C. Within this temperature range, the mixing can be conducted at temperatures of 100 to 210° C., specifically 120 to 210° C., and more specifically 140 to 200° C. When the composition is prepared below the glass transition temperature of the poly(phenylene ether), softening of the poly(phenylene ether) particles and agglomeration of the softened poly(phenylene ether) particles into larger particles is avoided. Moreover, mixing poly(phenylene ether) and polyoxymethylene at a temperature above the glass transition temperature of the poly(phenylene ether) would be difficult because the temperature would be close to or above the thermal decomposition temperature of the polyoxymethylene. When the composition is prepared at a temperature below the glass transition temperature of the poly(phenylene ether), the composition comprises poly(phenylene ether) particles that can be smaller than the poly(phenylene ether) particles when the composition is prepared at a temperature above the glass transition temperature of the poly(phenylene ether).

It is also advantageous to prepare the composition below the glass transition temperature of the poly(phenylene ether), because improved properties can be obtained. For example, when the composition is prepared at a temperature below the glass transition temperature of the poly(phenylene ether), a test part molded from the composition can have a flexural modulus that is 5 to 20% greater, and/or a flexural stress that is 10 to 50% greater, than a test part molded from the same composition prepared at a temperature above the glass transition temperature of the poly(phenylene ether), wherein the flexural modulus and/or flexural stress are measured at 23° C. and a sample thickness of 3.2 millimeters in accordance with ASTM D790-07e1.

The composition can be formed into articles by shaping, extruding, or molding. Thus in some embodiments, an article comprises a composition comprising (a) 1 to 40 weight percent of a poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the poly(phenylene ether) particles; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof. All of the above-described variations in the composition apply as well to the article comprising the composition.

Articles can be molded from the composition by known methods, such as injection molding, injection compression molding, gas assist injection molding, rotary molding, blow molding, compression molding and related molding processes. In some embodiments, the article is formed by injection molding. It can be advantageous to mold the composition below the glass transition temperature of the poly(phenylene ether), because improved properties can be obtained. For example, when the poly(phenylene ether) is poly(2,6-dimethyl-4-phenylene ether), which has a glass transition temperature of 215° C., the molding can be conducted at barrel temperatures of 180 to 210° C., specifically 190 to 210° C., and a mold temperature of 50 to 100° C., specifically 60 to 90° C., and more specifically 70 to 90° C. A specific injection molding procedure and temperatures applicable to the composition are described in the examples below. When the composition is mixed and molded below the glass transition temperature of the poly(phenylene ether), softening of the poly (phenylene ether) particles and agglomeration of the softened poly(phenylene ether) particles into larger particles is avoided. Moreover, molding the poly(phenylene ether) and polyoxymethylene at a temperature above the glass transition temperature of the poly(phenylene ether) would be difficult because the temperature would be close to or above the thermal decomposition temperature of the polyoxymethylene. Thus a method of forming an article comprising a composition, comprises forming the article at a temperature below the glass transition temperature of the poly(phenylene ether), wherein the composition comprises: (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the poly(phenylene ether) particles; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof. All of the above-described variations in the composition apply as well to the method of forming the article comprising the composition.

The composition is well-suited for use in a variety of articles, for example moving parts in appliances and machines, such as gears, bearings, bushings, rollers, springs, valves, and conveying devices; parts in automobiles, for example door handles, fasteners, knobs, fuel pump housings; plumbing and irrigation parts, such as valves, pumps, faucet underbodies, shower heads, impellers, and ball cocks; industrial or mechanical parts, such as rollers, bearings, gears, conveyer chains, and housings; consumer products, such as toiletry articles, zippers, pen barrels, disposable lighters, and toy parts; and electronics parts, such as key tops, buttons, and switches.

The invention includes at least the following embodiments.

Embodiment 1

A composition comprising: (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the poly(phenylene ether) particles; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof.

Embodiment 2

The composition of embodiment 1, comprising: a continuous phase comprising the polyoxymethylene; and a disperse phase comprising the poly(phenylene ether) particles.

Embodiment 3

The composition of embodiments 1 or 2, wherein the poly (phenylene ether) particles have a glass transition temperature that is 0 to 20° C. lower than the glass transition temperature of the poly(phenylene ether).

Embodiment 4

The composition of any of embodiments 1-3, wherein the poly(phenylene ether) particles consist of poly(phenylene ether).

Embodiment 5

The composition of any of embodiments 1-4, wherein the composition is prepared at a temperature below the glass transition temperature of the poly(phenylene ether).

Embodiment 6

The composition of embodiment 5, wherein the composition comprises poly(phenylene ether) particles that are smaller than the poly(phenylene ether) particles when the same composition is prepared at a temperature above the glass transition temperature of the poly(phenylene ether).

Embodiment 7

The composition of embodiments 5 or 6, wherein a test part molded from the composition has a flexural modulus that is 5 to 20% greater, and/or a flexural stress that is 10 to 50% greater, than a test part molded from the same composition prepared at a temperature above the glass transition temperature of the poly(phenylene ether), wherein the flexural modulus and/or flexural stress are measured at 23° C. and a sample thickness of 3.2 millimeters in accordance with ASTM D790-07e1.

Embodiment 8

The composition of any of embodiments 1-7, wherein the poly(phenylene ether) particles have an aspect ratio of 0.5 to 0.9.

Embodiment 9

The composition of any of embodiments 1-8, wherein the mean particle size of the poly(phenylene ether) particles is 1 to 10 micrometers.

Embodiment 10

The composition of any of embodiments 1-9, wherein 90 percent of the particle volume distribution of the poly(phenylene ether) particles is less than 8 micrometers.

Embodiment 11

The composition of any of embodiments 1-10, wherein the poly(phenylene ether) is poly(2,6-dimethyl-1,4-phenylene ether).

Embodiment 12

The composition of any of embodiments 1-11, wherein the polyoxymethylene is selected from a homopolymer of formaldehyde end-capped with acetic anhydride, a copolymer of formaldehyde and ethylene oxide or dioxolane, and a combination thereof.

Embodiment 13

The composition of any of embodiments 1-12, wherein polyolefins, rubber-modified polystyrenes, styrene-containing copolymers, hydrogenated and unhydrogenated block copolymers of an alkenyl aromatic compound and a conjugated diene, and combinations thereof are absent from the poly(phenylene ether) particles.

Embodiment 14

The composition of embodiments 5 or 6, having one or more of: a density of 1.10 to 1.38 grams per cubic centimeter, measured in accordance with ASTM D 792-08 at 23° C.; a heat deflection temperature of 105 to 150° C., measured at 1.92 megapascals in accordance with ASTM D648-07; and 2 to 30 weight percent char, based on the total weight of the poly(phenylene ether) particles and the polyoxymethylene, and measured at 600° C. in air by thermogravimetric analysis.

Embodiment 15

The composition of embodiment 1, wherein polystyrene is absent from the composition.

Embodiment 15a

A composition comprising: (a) 1 to 40 weight percent of poly(phenylene ether) particles having a mean particle size of 1 to 40 micrometers; and (b) 60 to 99 weight percent of a polyoxymethylene; wherein the weight percents are based on the combined weight of the poly(phenylene ether) particles and the polyoxymethylene; wherein polystyrene is absent from the composition; and wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof.

Embodiment 16

The composition of embodiment 4, comprising: (a) 5 to 40 weight percent of poly(2,6-dimethyl-1,4-phenylene ether) particles having a mean particle size of 1 to 10 micrometers; and (b) 60 to 95 weight percent of a polyoxymethylene selected from a homopolymer of formaldehyde end-capped with acetic anhydride, a copolymer of formaldehyde and ethylene oxide or dioxolane, and a combination thereof; and wherein the weight percents are based on the combined weight of the poly(2,6-dimethyl-1,4-phenylene ether) particles and the polyoxymethylene.

Embodiment 17

An article comprising the composition of embodiment 1.

Embodiment 18

A method of preparing the composition of embodiment 1, comprising mixing the poly(phenylene ether) particles and the polyoxymethylene at a temperature below the glass transition temperature of the poly(phenylene ether) particles.

Embodiment 19

The method of embodiment 18, wherein the poly(phenylene ether) particles consist of poly(2,6-dimethyl-1,4-phenylene ether), and the poly(2,6-dimethyl-1,4-phenylene ether) particles and polyoxymethylene are mixed at a temperature below 215° C.

Embodiment 20

A method of forming the article of embodiment 17, comprising forming the article at a temperature below the glass transition temperature of the poly(phenylene ether) particles.

The invention is further illustrated by the following non-limiting examples.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

A list of materials used in the examples is provided in Table 1.

TABLE 1

| Materials | |
|---|---|
| Component | Description and Supplier |
| PPE-A | Poly(2,6-dimethyl-1,4-phenylene ether), CAS Reg. No. 24938-67-8, having an intrinsic viscosity of 0.4 deciliters per gram, measured in chloroform at 25° C., and a mean particle size of 6.07 micrometers, obtained by jet milling and classifying PPO ™ 640 resin from SABIC Innovative Plastics (0.4 IV PPE), and described in Table 3. |
| POM-1 | Polyoxymethylene having a $T_g$ of −75° C. and a $T_m$ of 170° C., and obtained as DELRIN ™ 900P NC010 from Dupont. |
| POM-2 | Polyoxymethylene having a $T_m$ of 165° C., and obtained as CELCON ™ M90 ™ from Ticona. |

A summary of the test methods used to characterize the compositions of the present invention, and the comparative examples, is provided below in Table 2.

TABLE 2

Test Methods

| Test | Description |
|---|---|
| Density, g/cc | Determined according to ASTM D 792-08 at 23° C. |
| Flexural Modulus, MPa | ASTM D790-07e1 |
| Flexural Stress @ 5% Strain, MPa | ASTM D790-07e1 |
| HDT @ 1.82 MPa, ° C. | ASTM D648-07 |
| HDT @ 0.455 MPa, ° C. | ASTM D648-07 |
| Char in Nitrogen, at 600° C., wt % | Thermogravimetric analysis in nitrogen, heating rate 20° C. per minute, the residue at 600° C. |
| Char in Nitrogen, at 700° C., wt % | Thermogravimetric analysis in nitrogen, heating rate 20° C. per minute, the residue at 700° C. |
| Char in Nitrogen, at 800° C., wt % | Thermogravimetric analysis in nitrogen, heating rate 20° C. per minute, the residue at 800° C. |
| Char in Air, at 600° C., wt % | Thermogravimetric analysis in air, heating rate 20° C. per minute, the residue at 600° C. |
| Char in Air, at 700° C., wt % | Thermogravimetric analysis in air, heating rate 20° C. per minute, the residue at 700° C. |
| Char in Air, at 800° C., wt % | Thermogravimetric analysis in air, heating rate 20° C. per minute, the residue at 800° C. |

Char was measured by Thermal Gravimetric Analysis (TGA). TGA was conducted on a TA INSTRUMENTS THERMOGRAVIMETRIC ANALYZER™ from ambient temperature to 800° C. at a 20° C./minute temperature ramp. The analyses were conducted under nitrogen or air. All sample weights were in the range of 10.0±5 milligrams. The residual weight percentage was recorded at 600° C., 700° C., and 800° C.

Preparative Example

Jet Milling and Classification of Poly(Phenylene Ether)

Poly(2,6-dimethyl-1,4-phenylene ether) (PPE) particles were obtained by jet milling commercial grade poly(phenylene ether). Compressed nitrogen gas was introduced into nozzles of the jet mill to create a supersonic grinding stream. Commercial grade PPE (PPO™ 640) in solid form, was injected into this violent, turbulent, rotating nitrogen stream. Particle-on-particle impact collisions in this grinding stream resulted in substantial particle size reductions. Large particles were held in the grinding area by centrifugal force while centripetal force drove finer particles towards the center of the discharge. A sieve of a specific upper size limit was then used to recover particles with a precise size distribution and having diameters below the nominal sieve openings. Larger particles were recycled to the reduction size chamber for further grinding. The PPE particles were classified by passing the jet-milled particles through a screen with 6, 14, or 20 micrometer openings. The resulting classified PPE particles are designated PPE-A, PPE-B, and PPE-C, respectively, in Table 2. PPE particles of larger particle size was obtained by sieving PPO™ 640 without jet milling. The PPO™ 640 was sized using U.S. Standard No. 200 (75 micrometer openings), No. 100 (150 micrometer openings), and No. 60 (250 micrometer openings). The resulting classified PPE particles are designated PPE-D, PPE-E, and PPE-F, respectively, in Table 3. Characterization of the PPE particles is provided in Table 3. Particle size and shape distribution was determined using the CAMSIZER™ XT from Retsch Technology GmbH operating in air dispersion mode.

TABLE 3

Particle Size of Poly(2,6-dimethyl-1,4-phenylene ether) Particles

| PPE | Method | Particle Size$^a$ (μm) | Stand. Dev. | D(v, 0.9)$^b$ (μm) | D(v, 0.5)$^c$ (μm) | D(v, 0.1)$^d$ (μm) | Aspect Ratio |
|---|---|---|---|---|---|---|---|
| PPE-A | Milling | 6.07 | 2.3 | 8.1 | 5.9 | 4.0 | 0.709 |
| PPE-B | Milling | 10.9 | 4.7 | 17.0 | 10.4 | 5.5 | 0.724 |
| PPE-C | Milling | 15.7 | 5.9 | 23.3 | 15.2 | 8.6 | 0.855 |
| PPE-D | Sieving$^e$ | 46.7 | 25.3 | 79.2 | 46.6 | 11.2 | 0.755 |
| PPE-E | Sieving$^f$ | 87.8 | 54.1 | 160.8 | 87.3 | 16.7 | 0.749 |
| PPE-F | Sieving$^g$ | 264.1 | 97.6 | 377.7 | 275.2 | 122.6 | 0.747 |
| PPE-G | Sieving$^h$ | 538.8 | 197.9 | 769.6 | 541.5 | 369.5 | 0.759 |

$^a$Mean particle size volume distribution.
$^b$D(v, 0.1) - 10% of the volume distribution is below this value.
$^c$D(v, 0.5) - 50% of the volume distribution is below this value.
$^d$D(v, 0.9) - 90% of the volume distribution is below this value.
$^e$U.S. Standard Sieve No. 200 (Sieve opening - 75 μm).
$^f$U.S. Standard Sieve No. 100 (Sieve opening - 150 μm).
$^g$U.S. Standard Sieve No. 60 (Sieve opening - 250 μm).
$^h$U.S. Standard Sieve No. 40 (Sieve opening - 425 μm).

The shape of the PPE particles was examined by Scanning Electronic Microscopy (SEM). Samples were coated with gold and examined using a Carl Zeiss AG—EVO™ 40 Series scanning electron microscope. The conditions were SEM mode, a probe current of 40 picoamps, HV (high vacuum), and an acceleration voltage of 20 kilovolts. There were a great variety of particle shapes, in the PPE particles, which consisted partly of perturbed or irregularly shaped ellipsoidal and spheroidal particles, as viewed under 1,000× magnification by SEM. An SEM image of PPE-A is provided in FIG. 1.

The particle size and shape distribution of the poly(2,6-dimethyl-1,4-phenylene ether) particles were determined using the CAMSIZER™ XT from Retsch Technology GmbH operating in air dispersion mode. The particle size is reported as a circular equivalent diameter. Where the 3-dimensional particle is imaged as 2-dimensional particle, the area of 2-dimensional image is converted to a circle with equal area, and the diameter of the circle measured. The aspect ratio is calculated by dividing the breath by the length of the 2-dimensional image.

Particle size measurements were calibrated using a certified NIST traceable highly precise (±0.1 micrometer) standard provided by Retsch Technology. The reference object is an electron beam lithographic pattern that simulates the entire measuring dynamic range of differently sized particles (1-3000 micrometers). The validation of particle size was carried out using a NIST traceable DRI-CAL™ particle size secondary standard. The standard was comprised of polystyrene/divinylbenzene polymeric beads having a mean diameter of 23.2 micrometers±0.7 micrometer.

The PPE particles designated "PPE-A" in Table 3, and having a mean particle size of 6.07 micrometers, were used in the following examples.

Examples 1-7 and Comparative Examples 1-6

Blends of PPE particles with POM-1 or POM-2 (Examples 1-8 and Comparative Examples 3, 4, and 5) were tested against comparative samples of POM-1 or POM-2 (Comparative Examples 1 or 2), respectively. The compositions are summarized in Table 4.

TABLE 4

Compositions

| Example | POM-1 (wt %) | POM-2 (wt %) | PPE-A (wt %) |
|---|---|---|---|
| C. Ex. 1 | 100 | — | 0 |
| Ex. 1 | 90 | — | 10 |
| Ex. 2 | 80 | — | 20 |
| Ex. 3 | 70 | — | 30 |
| Ex. 4 | 60 | — | 40 |
| C. Ex. 2 | — | 100 | 0 |
| Ex. 5 | — | 90 | 10 |
| Ex. 6 | — | 80 | 20 |
| Ex. 7 | — | 70 | 30 |
| C. Ex. 3 | — | 60 | 40 |
| C. Ex. 4 | — | 50 | 50 |
| C. Ex. 5 | — | 80 | 20 |
| C. Ex. 6 | — | 60 | 40 |

The compositions of Examples 1-7 were prepared by compounding and extrusion at temperatures below the glass transition temperature of the PPE (215° C.), using a Coperion ZSK 18 twin-screw laboratory extruder having screw outer diameters of 18 millimeters. Comparative Examples 4-6 were extruded at temperatures above the glass transition temperature of the PPE. Extrusion conditions are summarized in Table 5.

TABLE 5

Extrusion Conditions

| Ex. | Zone 1 (° C.) | Zone 2 (° C.) | Zone 3 (° C.) | Zone 4 (° C.) | Zone 5 (° C.) | Zone 6 (° C.) | Die (° C.) | Screw Speed (rpm) | Torque (%) |
|---|---|---|---|---|---|---|---|---|---|
| Ex. 1 | 150 | 150 | 170 | 170 | 170 | 180 | 180 | 400 | 35 |
| Ex. 2 | 160 | 160 | 170 | 170 | 170 | 180 | 180 | 400 | 30 |
| Ex. 3 | 160 | 160 | 170 | 180 | 180 | 180 | 180 | 400 | 25-30 |
| Ex. 4 | 160 | 170 | 180 | 180 | 190 | 190 | 190 | 400 | 20-25 |
| Ex. 5 | 140 | 150 | 170 | 170 | 180 | 180 | 180 | 300 | 45-50 |
| Ex. 6 | 140 | 150 | 170 | 170 | 180 | 180 | 180 | 300 | 35-40 |
| Ex. 7 | 140 | 150 | 170 | 180 | 180 | 180 | 180 | 400 | 30 |
| C. Ex. 3 | 160 | 170 | 180 | 190 | 190 | 200 | 200 | 300 | 35 |
| C. Ex. 4 | 160 | 170 | 180 | 190 | 190 | 200 | 200 | 400 | 35 |
| C. Ex. 5 | 210 | 230 | 230 | 230 | 230 | 230 | 180 | 400 | 35 |
| C. Ex. 6 | 210 | 230 | 230 | 230 | 230 | 230 | 200 | 400 | 39 |

Test parts having a thickness of 0.125 inch (3.2 millimeters) were prepared by injection molding of Examples 1-7 and Comparative Examples 1-2 at temperatures below the glass transition temperature of the PPE, using a Demag Plastic Group Model 40-80 injection molding machine. Test parts were also prepared by injection molding of Comparative Examples 4-6 at temperatures above the glass transition temperature of the PPE. The injection molding conditions are summarized in Table 6.

TABLE 6

Injection Molding Conditions

| Example | Zone 1 (° C.) | Zone 2 (° C.) | Zone 3 (° C.) | Zone 4 (° C.) | Mold (° C.) | Injection (psi) | Back Pressure (psi) |
|---|---|---|---|---|---|---|---|
| C. Ex. 1 | 188 | 188 | 188 | 188 | 77 | 1200 | 20 |
| Ex. 1 | 188 | 188 | 188 | 188 | 77 | 1200 | 30 |
| Ex. 2 | 199 | 199 | 199 | 199 | 77 | 1200 | 40 |
| Ex. 3 | 204 | 204 | 204 | 204 | 82 | 1200 | 40 |
| Ex. 4 | 210 | 210 | 210 | 210 | 82 | 1600 | 40 |
| C. Ex. 2 | 188 | 188 | 188 | 188 | 82 | 1200 | 30 |
| Ex. 5 | 199 | 199 | 199 | 199 | 82 | 1200 | 30 |
| Ex. 6 | 204 | 204 | 204 | 204 | 82 | 1200 | 30 |
| Ex. 7 | 204 | 204 | 204 | 204 | 82 | 1200 | 30 |
| C. Ex. 3 | 226 | 226 | 226 | 226 | 82 | 2200 | 30 |
| C. Ex. 4 | 232 | 232 | 232 | 232 | 82 | 2200 | 30 |
| C. Ex. 5 | 225 | 225 | 225 | 225 | 82 | 2200 | 30 |
| C. Ex. 6 | 225 | 225 | 225 | 225 | 82 | 2200 | 30 |

The properties of the POM-1 and POM-2 compositions are summarized in Tables 7 and 8, respectively.

TABLE 7

Properties of POM-1 Compositions

| Example | C. Ex. 1 | Ex. 1 | Ex. 2 | Ex. 3 | Ex. 4 |
|---|---|---|---|---|---|
| POM-1 | 100 | 90 | 80 | 70 | 60 |
| PPE-A | 0 | 10 | 20 | 30 | 40 |
| Density (g/cc) | 1.4075 | 1.3639 | 1.32235 | 1.29205 | 1.24705 |
| Deflection temp. @ 1.82 MPa (° C.) | 102 | 113 | 121 | 131 | 133 |
| Deflection temp. @ 0.455 MPa (° C.) | 167 | 167 | 167 | 167 | 167 |
| Flexural modulus (MPa) | 2873 | 2932 | 2923.5 | 2896 | 2816 |
| Flexural stress @ 5% Strain (MPa) | 92 | 87 | 81 | 67 | 49 |
| Char in nitrogen at 600° C. (wt %) | 0.34 | 3.14 | 6.03 | 9.45 | 12.89 |
| Char in nitrogen at 700° C. (wt %) | 0.33 | 2.85 | 5.49 | 8.58 | 11.67 |
| Char in nitrogen at 800° C. (wt %) | 0.31 | 2.7 | 5.24 | 8.14 | 10.97 |
| Char in air at 600° C. (wt %) | 0 | 3.52 | 7.92 | 12.13 | 16.47 |
| Char in air at 700° C. (wt %) | 0 | 0.33 | 0.7 | 1.5 | 6.31 |
| Char in air at 800° C. (wt %) | 0 | 0.26 | 0.22 | 0.4 | 0.4 |

TABLE 8

Properties of POM-2 Compositions

| Example | C. Ex. 2 | Ex. 5 | Ex. 6 | Ex. 7 | C. Ex. 3 | C. Ex. 4 | C. Ex. 5 | C. Ex. 6 |
|---|---|---|---|---|---|---|---|---|
| POM-2 | 100 | 90 | 80 | 70 | 60 | 50 | 80 | 60 |
| PPE-A | 0 | 10 | 20 | 30 | 40 | 50 | 20 | 40 |
| Density (g/cc) | 1.4006 | 1.3574 | 1.3179 | 1.2811 | 1.2401 | a | 1.3177 | 1.2399 |
| Deflection temperature @ 1.82 MPa (° C.) | 100 | 107 | 113 | 119 | 123 | a | 112 | 122 |
| Deflection temperature @ 0.455 MPa (° C.) | 158 | 158 | 158 | 158 | 158 | a | 157 | 158 |
| Flexural Modulus (MPa) | 2501 | 2510 | 2526 | 2560 | 2509 | a | 2371 | 2259 |
| Flexural Stress @ 5% Strain (MPa) | 83 | 80 | 75 | 62 | 42 | a | 68 | 30 |
| Char in nitrogen at 600° C. (wt %) | 0 | 6.26 | 9.44 | 12.24 | 14.93 | 16.02 | — | — |
| Char in nitrogen at 700° C. (wt %) | 0 | 5.71 | 8.62 | 11.05 | 13.58 | 14.49 | — | — |
| Char in nitrogen at 800° C. (wt %) | 0 | 5.46 | 8.23 | 10.33 | 12.88 | 13.69 | — | — |
| Char in air at 600° C. (wt %) | 0 | 2.8 | 7.95 | 12.89 | 15.73 | 20.54 | — | — |
| Char in air at 700° C. (wt %) | 0 | 0 | 0.4 | 1.65 | 1.98 | 6.05 | — | — |
| Char in Air at 800° C. (wt %) | 0 | 0 | 0 | 0 | 0 | 0.23 | — | — | a) C. Ex. 4 formed very poor looking parts, so properties other than char yield were not measured.

In general, there was an enhancement of properties with the addition of PPE particles to the polyoxymethylenes. (See Examples 1-4 versus Comparative Example 1 and Examples 5-7 versus Comparative Example 2.) For example, density decreased with increasing levels of PPE particles, which means reduced weight for molded articles. Also, heat deflection temperatures at 1.82 MPa increased with increasing levels of PPE particles, meaning better temperature resistance for molded articles. Char increased with increasing levels of PPE particles. Increased char suggests that less fuel is being produced from thermal decomposition as the amount of PPE particles increases. Thus compositions comprising PPE particles can exhibit enhanced flame retardance.

Figure 2:
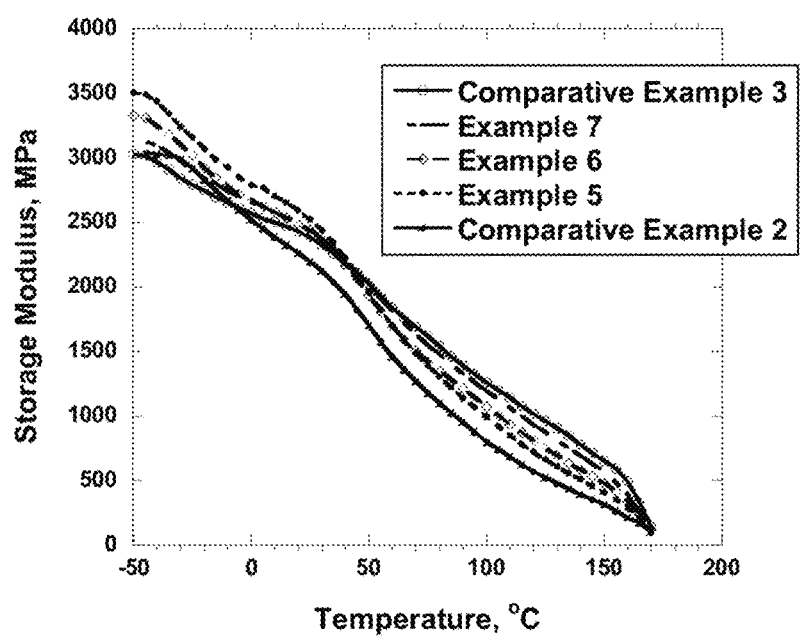
FIG. 2 is as graph of storage modulus in megapascals as a function of temperature in ° C. for Examples 5-7 and Comparative Example 3, as measured by Dynamic Mechanical Analysis.
Figure 3:
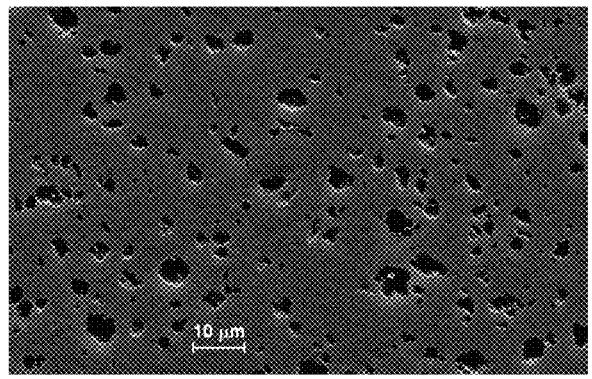
FIG. 3 is a scanning electron microscope image of a microtomed surface of an injection-molded sample of the composition of Example 5 after extraction with toluene, as viewed under 1,000× magnification.

There was little change in the flexural modulus at ambient temperature as a function of PPE particles content. In general, modulus values of polymers decrease with increasing temperature. Consequently for applications in which parts are exposed to elevated temperatures, it is desirable to maintain a high modulus above room temperature. Dynamic Mechanical Analysis, otherwise known as DMA, is a technique which measures stiffness of a material as a function of temperature and is reported as modulus. DMA is also called DMTA for Dynamic Mechanical Thermal Analysis. The DMA procedure involves applying small deformation to a sample in a cyclic manner. This allows the material to respond to stress, temperature, frequency, and other values of interest. Because the applied force is sinusoidal, the modulus can be expressed as an in-phase component, the storage modulus, and an out of phase component, the loss modulus. Storage modulus, which is a measure of elastic behavior, was measured using a TA Instruments DMA Q800 V7.5 in flexural mode following the test method of ASTM D4440, wherein the temperature was increased at 4° C./minute and the frequency was 1 Hz. A plot of storage modulus versus temperature is provided in FIG. 2. These data indicate that at any given temperature, the storage modulus increased with increasing levels of PPE particles.

The PPE particles serve as an organic filler. The inventors have found that it is necessary to disperse the PPE particles effectively in order to obtain the best possible properties. Scanning Electronic Microscopy (SEM) was used to assess the quality of the dispersion of PPE particles in POM-2 as a function of weight or volume fraction of the PPE particles. The microtomed surfaces of injection-molded samples of Examples 3 and 6-9 were etched in toluene for 15 seconds. Since the PPE is soluble in toluene, it was extracted from the surface. Since POM-2 is insoluble in toluene, the voids left by the extracted PPE in the POM-2 matrix provide a visual representation of the quality of the dispersion of the PPE particles and the PPE particle size. The samples were examined using a Carl Zeiss AG—EVO™ 40 Series scanning electron microscope. The conditions were SEM mode, a probe current of 40 picoamps, HV (high vacuum), and an acceleration voltage of 20 kilovolts. The images were all obtained at the same level of magnification of 1,000×.

The densities of POM-2 and are 1.4 and 1.06, respectively. The volume fractions of the PPE particles in Examples 5-7 and Comparative Examples 3-6 were calculated from the weight fractions and densities of the POM-2 and PPE particles. The weight and volume fractions are summarized in Table 9. SEM images of the extracted samples of Examples 5-7 and Comparative Examples 3-6 are provided in FIGS. 3-9, respectively. Visual observations on the quality of the dispersion of the PPE particles in the POM-2 matrix, based on the SEM images, are also summarized in Table 9.

TABLE 9

Volume Fractions and SEM Observations of PO-2 Compositions

| Example | Figure | Weight Fraction | Volume Fraction | Observations from SEM |
|---|---|---|---|---|
| Ex. 5 | 3 | 0.100 | 0.138 | Good dispersion. |
| Ex. 6 | 4 | 0.200 | 0.248 | Good dispersion. |
| Ex. 7 | 5 | 0.300 | 0.361 | Good dispersion. |
| C. Ex. 3 | 6 | 0.400 | 0.468 | Some contact between PPE particles. |
| C. Ex. 4 | 7 | 0.500 | 0.569 | Substantial contact between PPE particles. |
| C. Ex. 5 | 8 | 0.200 | 0.248 | PPE particles rounder and larger than those of Ex. 6, having the same PPE-A amount. |
| C. Ex. 6 | 9 | 0.400 | 0.468 | PPE particles rounder and larger than those of Comp. Ex. 3, having the same PPE-A amount. |

Figure 6:
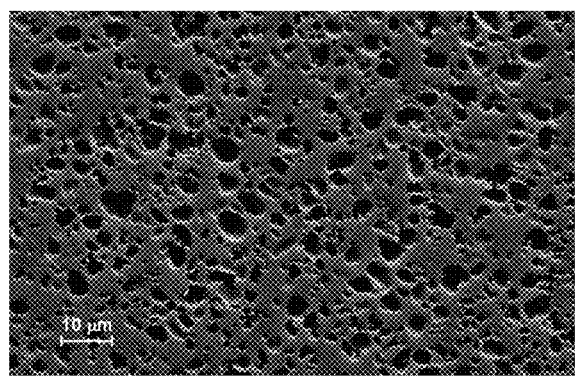
FIG. 6 is a scanning electron microscope image of a microtomed surface of an injection-molded sample of the composition of Comparative Example 3 after extraction with toluene, as viewed under 1,000× magnification.
Figure 7:
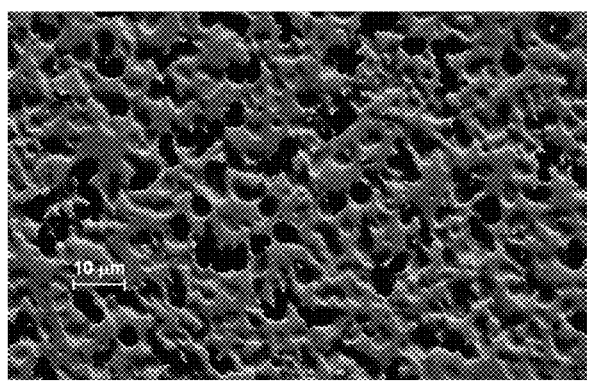
FIG. 7 is a scanning electron microscope image of a microtomed surface of an injection-molded sample of the composition of Comparative Example 4 after extraction with toluene, as viewed under 1,000× magnification.
Figure 8:
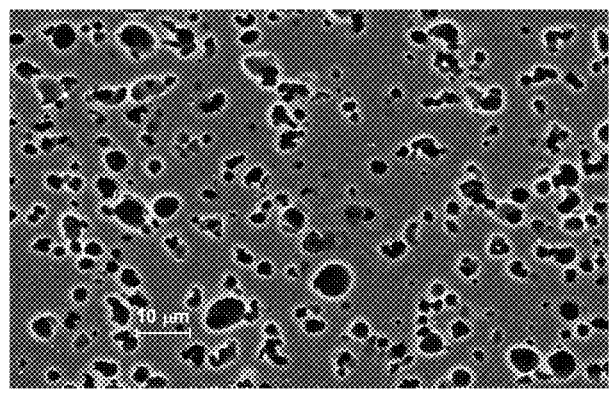
FIG. 8 is a scanning electron microscope image of a microtomed surface of an injection-molded sample of the composition of Comparative Example 5 after extraction with toluene, as viewed under 1,000× magnification.
Figure 9:
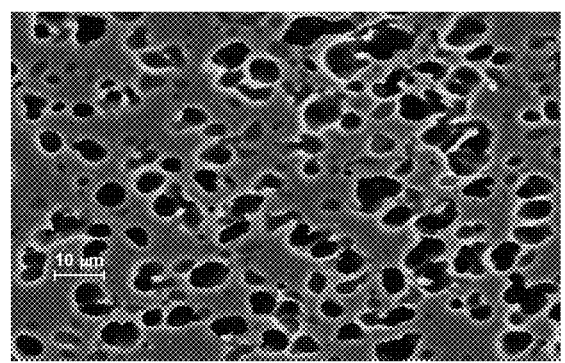
FIG. 9 is a scanning electron microscope image of a microtomed surface of an injection-molded sample of the composition of Comparative Example 6 after extraction with toluene, as viewed under 1,000× magnification.

The SEM images of the extracted samples of Examples 5-7 (FIGS. 3-5) are similar in appearance, indicating comparable quality of the dispersion of PPE particles in the POM-2 matrix. When the weight fraction of PPE particles reaches 0.4 (Comparative Example 3), there is some indication of PPE particles touching (FIG. 6). When the weight fraction of PPE particles is 0.5 (Comparative Example 4), there is substantial contact between the PPE particles (FIG. 7).

Figure 4:
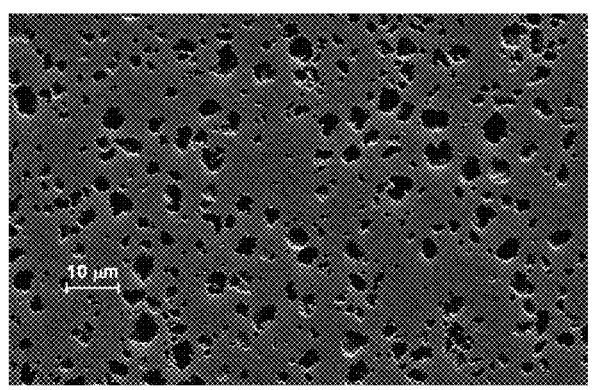
FIG. 4 is a scanning electron microscope image of a microtomed surface of an injection-molded sample of the composition of Example 6 after extraction with toluene, as viewed under 1,000× magnification.
Figure 5:
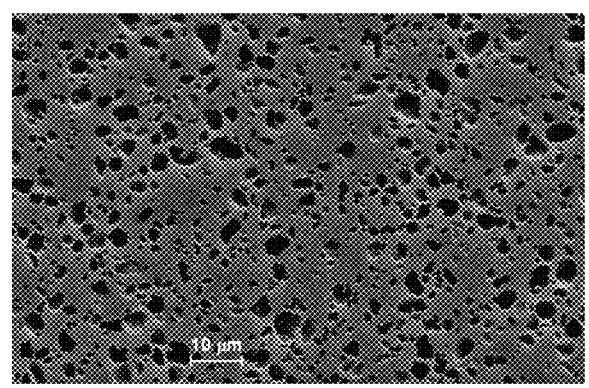
FIG. 5 is a scanning electron microscope image of a microtomed surface of an injection-molded sample of the composition of Example 7 after extraction with toluene, as viewed under 1,000× magnification.

In general, mechanical properties of molding compositions are most affected by the quality of dispersion of filler particles. At high volume fractions, filler particles can come in contact with one another. Agglomerates of filler particles can serve as flaws that can initiate crack formation and thus adversely affect mechanical properties. The effects of extrusion and injection molding below the glass transition temperature of the PPE are demonstrated by comparing the properties of Example 6 with Comparative Example 5. Despite having identical compositions, Comparative Example 5 has lower flexural modulus and flexural stress than Example 6. The SEM image of the extracted sample of Comparative Example 5 (FIG. 8) shows larger and rounder domains than Example 6 (FIG. 4). These results indicate that compositions prepared below the glass transition temperature of the poly (phenylene ether) are different than compositions prepared above the glass transition temperature of the poly(phenylene ether). These results also indicate that, advantageously, compositions prepared below the glass transition temperature of the poly(phenylene ether) can have improved mechanical properties compared to compositions prepared above the glass transition temperature of the poly(phenylene ether).

The invention claimed is:

1. A composition comprising:
(a) 1 to 40 weight percent of poly(phenylene ether) particles having a mean particle size of 1 to 40 micrometers; and
(b) 60 to 99 weight percent of a polyoxymethylene selected from a homopolymer of formaldehyde end-capped with acetic anhydride, a copolymer of formaldehyde and ethylene oxide or dioxolane, and a combination thereof;
wherein the weight percents are based on the combined weight of the poly(phenylene ether) particles and the polyoxymethylene;
wherein polystyrene is absent from the poly(phenylene ether) particles; and
wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof; and
wherein the poly(phenylene ether) particles and polyoxymethylene are mixed at a temperature of 100 to 200° C., provided that the temperature is below the glass transition temperature of the poly(phenylene ether).

2. The composition of claim 1, comprising:
a continuous phase comprising the polyoxymethylene; and
a disperse phase comprising the poly(phenylene ether) particles.

3. The composition of claim 1, wherein the poly(phenylene ether) particles have a glass transition temperature that is 0 to 20° C. lower than the glass transition temperature of the poly(phenylene ether).

4. The composition of claim 1, wherein the poly(phenylene ether) particles consist of poly(phenylene ether).

5. The composition of claim 4, wherein the composition is prepared at a temperature below the glass transition temperature of the poly(phenylene ether).

6. The composition of claim 5, wherein the composition comprises poly(phenylene ether) particles that are smaller than the poly(phenylene ether) particles when the composition is prepared at a temperature above the glass transition temperature of the poly(phenylene ether).

7. The composition of claim 4, wherein a test part molded from the composition has a flexural modulus that is 5 to 20% greater, and/or a flexural stress that is 10 to 50% greater, than a test part molded from the same composition prepared at a temperature above the glass transition temperature of the poly(phenylene ether), wherein the flexural modulus and/or flexural stress are measured at 23° C. and a sample thickness of 3.2 millimeters in accordance with ASTM D790-07e1.

8. The composition of claim 4, wherein the poly(phenylene ether) particles have an aspect ratio of 0.5 to 0.9.

9. The composition of claim 4, wherein the mean particle size of the poly(phenylene ether) particles is 1 to 10 micrometers.

10. The composition of claim 4, wherein 90 percent of the particle volume distribution of the poly(phenylene ether) particles is less than 8 micrometers.

11. The composition of claim 4, wherein the poly(phenylene ether) is poly(2,6-dimethyl-1,4-phenylene ether).

12. The composition of claim 1, wherein polyolefins, rubber-modified polystyrenes, styrene-containing copolymers, hydrogenated and unhydrogenated block copolymers of an alkenyl aromatic compound and a conjugated diene, and combinations thereof are absent from the poly(phenylene ether) particles.

13. The composition of claim 4, having one or more of:
a density of 1.10 to 1.38 grams per cubic centimeter, measured in accordance with ASTM D 792-08 at 23° C.;
a heat deflection temperature of 105 to 150° C., measured at 1.92 megapascals in accordance with ASTM D648-07; and
2 to 30 weight percent char, based on the total weight of the poly(phenylene ether) particles and the polyoxymethylene, and measured at 600° C. in air by thermogravimetric analysis.

14. A composition comprising:
(a) 1 to 40 weight percent of poly(phenylene ether) particles having a mean particle size of 1 to 40 micrometers; and
(b) 60 to 99 weight percent of a polyoxymethylene selected from a homopolymer of formaldehyde end-capped with acetic anhydride, a copolymer of formaldehyde and ethylene oxide or dioxolane, and a combination thereof;
wherein the weight percents are based on the combined weight of the poly(phenylene ether) particles and the polyoxymethylene;
wherein polystyrene is absent from the composition; and
wherein the composition comprises less than 0.1 volume percent, based on the total volume of the composition, of particulate metals, metalloids, oxides thereof, and combinations thereof, wherein the metals and metalloids are selected from iron, copper, aluminum, magnesium, lead, zinc, tin, chromium, nickel, tungsten, silicon, gold, silver, platinum, and alloys thereof; and
wherein the poly(phenylene ether) particles and polyoxymethylene are mixed at a temperature of 100 to 210° C., provided that the temperature is below the glass transition temperature of the poly(phenylene ether).

15. The composition of claim 4, comprising:
(a) 5 to 40 weight percent of poly(2,6-dimethyl-1,4-phenylene ether) particles having a mean particle size of 1 to 10 micrometers; and
(b) 60 to 95 weight percent of a polyoxymethylene selected from a homopolymer of formaldehyde end-capped with acetic anhydride, a copolymer of formaldehyde and ethylene oxide or dioxolane, and a combination thereof; and
wherein the weight percents are based on the combined weight of the poly(2,6-dimethyl-1,4 phenylene ether) particles and the polyoxymethylene.

16. An article comprising the composition of claim 1.

17. A method of preparing the composition of claim 1, comprising mixing the poly(phenylene ether) particles and the polyoxymethylene at a temperature of 100 to 210° C., temperature is below the glass transition temperature of the poly(phenylene ether) particles.

18. The method of embodiment 18, wherein the poly(phenylene ether) particles consist of poly(2,6-dimethyl-1,4-phenylene ether), and the poly(2,6-dimethyl-1,4-phenylene ether) particles and polyoxymethylene are mixed at a temperature of 140 to 200° C.

19. A method of forming the article of claim 16, comprising forming the article at a temperature of 100 to 210° C., provided that the temperature is below the glass transition temperature of the poly(phenylene ether) particles.

* * * * *